Feb. 18, 1936.  W. M. HENSEL  2,030,920
COLOR ENGRAVING PROCESS
Filed Feb. 3, 1934  3 Sheets-Sheet 3

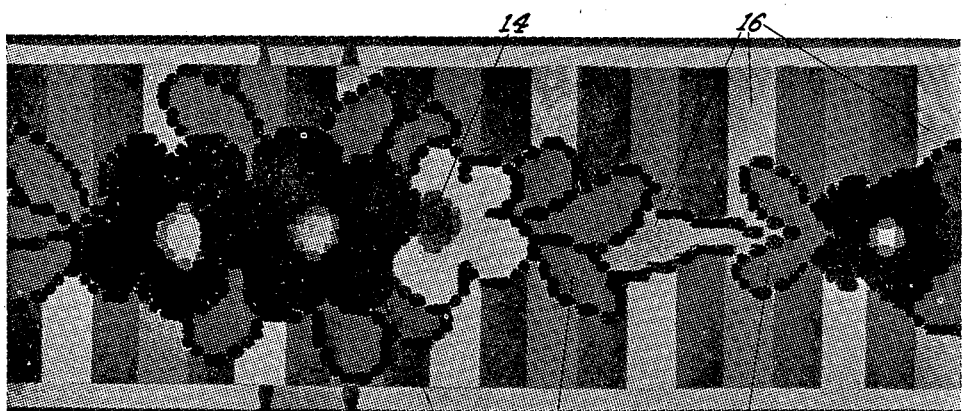
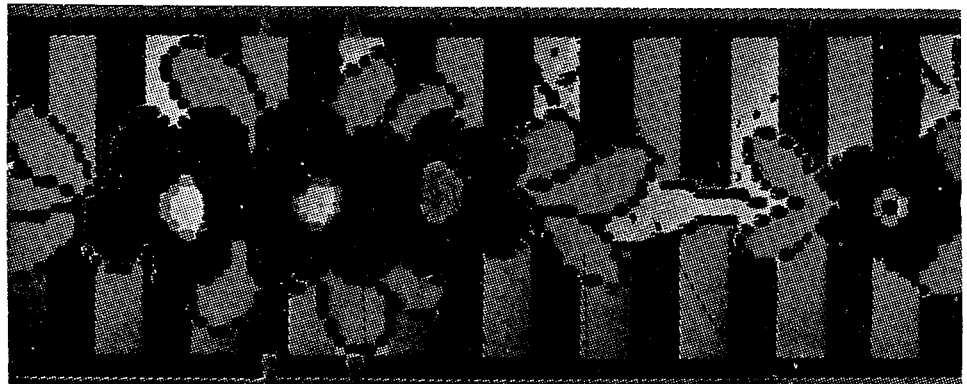
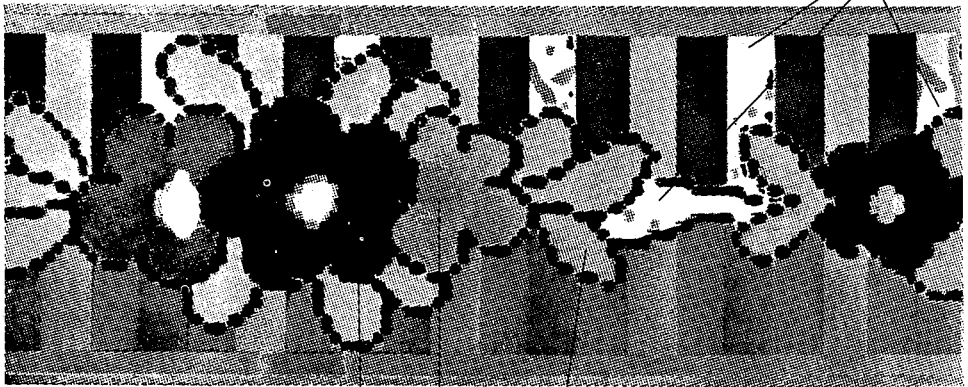

WILLIAM M. HENSEL
INVENTOR
PER Albert J. Fike
ATTORNEY

Patented Feb. 18, 1936

2,030,920

UNITED STATES PATENT OFFICE 2,030,920

COLOR ENGRAVING PROCESS

William M. Hensel, Chicago, Ill.

Application February 3, 1934, Serial No. 709,623

1 Claim. (Cl. 95—5.3)

This invention relates to an improved color engraving process and has for one of its principal objects the provision of a method of color engraving wherein the natural colors of an object to be represented will be reproduced more correctly and practically mechanically.

At the outset, it might be mentioned that in the present day process of three and four color photo-engraving, the plates used for imprinting the reds, yellows, blues and blacks must in almost all cases be retouched by hand in order that the true colors of the original may be brought out. The color filters used in photographing the original and producing the negatives from which the plates are made have never been perfected to such an extent that all the true gradations and combinations of the original colors will be properly reproduced by a later combination or superimposing of the colored imprints of the plates upon each other.

Accordingly, it is incumbent upon the photo-engraver and photo-lithographer to retouch and re-etch the various color plates so that those portions which would make too heavy an imprint of a certain color are eaten away by the etching acid, thereby resulting in a lighter imprint and a more accurate reproduction. This, of course, requires considerable skill and also the exercise of very good judgment due to long experience, and in addition, is a tedious process. One object of the invention is to produce the desired results in a mechanical manner, thereby partly eliminating this hand labor and also eliminating inaccuracies which are otherwise practically unavoidable.

One of the important objects of this invention is to provide a method of color separation wherein all or substantially all of the hand labor known as stopping out or hand staging is eliminated.

Another important object of the invention resides in the provision of a method or preparation of the plates for three or four color printing whether continuous tone or half tone wherein the true colors will be invariably reproduced in their various gradations and combinations.

A still further object of the invention is the provision of a method of three or four color photo-engraving wherein an extra photographic plate is used for the final preparation of the desired properly etched plates for impressing and overlaying the various colors upon a sheet and with respect to each other whereby the original true colors will be practically automatically reproduced.

Other and further important objects of the invention will be apparent from the disclosures in the accompanying drawings and following specification.

The invention, in a preferred form, is illustrated in the drawings and hereinafter more fully described.

In the drawings:

Figure 1 is a greatly enlarged reproduction of a portion of a photo-engraving color process halftone print, and in this particular case, illustrates the plate used for producing red colors in its original state after the usual first etching.

Figure 2 is a view of the same plate after having been treated and partially protected by a second printing process against etching and after the first etching.

Figure 3 is a further view of the same plate, showing the same after washing to remove the second protective coating and the second etching of the improved treatment of this invention.

As shown in the drawings:

Figure 4:
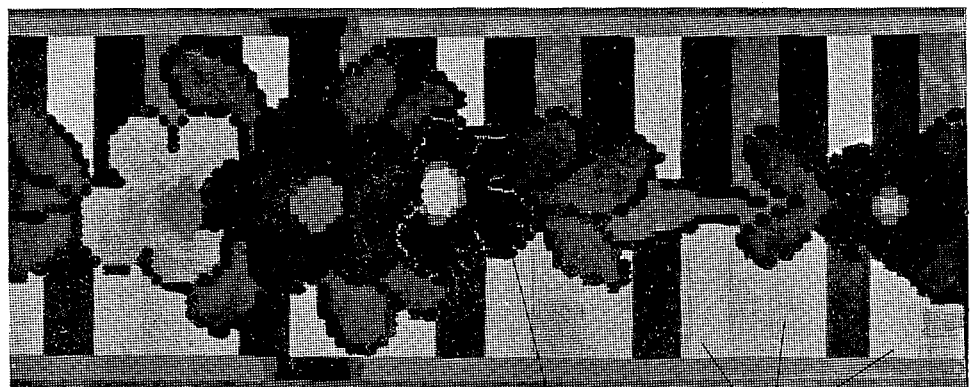
Figure 4 is a view similar to Figure 1 of an original yellow plate.

The reference numeral 10 in Figure 1 indicates those portions of the red plate which, if undisturbed, will properly reproduce the desired red color in the finished picture. The portions indicated by the reference numeral 12 show those parts which, when combined with an overlay of blue and yellow will produce a green color. Obviously, these greens may be of various shades, and the proper combining of the reds, yellows and blues to produce these shades is one of the essential elements involved in the true reproduction of an original. In the particular case illustrated in Figure 1, the portions indicated by the reference numeral 12 are far too heavy and require further etching to reduce the size of the halftone dots so that the red will not be so predominant in the final composite picture. Attention is also directed to the spot indicated by the reference numeral 14 which is desired to be lavender in the final picture and which is also entirely too heavy with red in the present case, inasmuch as a preponderance of red with the blue would then produce an incorrect violet or perhaps a purple. The spaces indicated by the reference numerals 16 should be quite a light green in the final picture, and hence any red whatsoever would be undesirable if the print shown in Figure 1 were not further etched.

Previously, by the old method, these plates have been protected by covering those portions which are correct with some protective material, after which the uncovered portions are subjected to further action of the etching bath whereupon the half-tone dots are further eaten away from the portions not covered or protected, which, accordingly, results in a much lighter imprint of that particular color on the final job.

In the particular process of this invention, one or more extra photographic plates are made at the same time that the regular three or four color process negatives are being made either continuous tone or half-tone. These photographic line plates may be made by either a wet or a dry plate method and are made through a dense orange filter and over-exposed to photograph the yellows, reds and magentas as much as possible. It is then over-developed to solidify these colors.

The photographic plate made from the original or from either color separation continuous tone negatives or positives is then used to further the separation of colors as desired.

For example, the plate shown in Figure 1 is first coated with an enamel solution as in the regular half-tone process printing method and completed, and then covered with a light sensitive solution such as albumen and dichromate which is commonly known as a zinc printing solution. The extra photographic line plate is now placed in contact with the half-tone print shown in Figure 1 and in proper registry therewith, and exposed to light. This prints the image of the extra photographic plate onto the half-tone process print of Figure 1 which is then developed and rolled up with printing ink in the regular way. After topping with an ordinary topping powder, the plate is ready for etching, and the condition thereof after etching is illustrated in Figure 2.

It will be noted that the portions 10 which are desired for reproducing the red color have been thoroughly covered or protected against the acid bath while the portions 12, 14 and 16 have been left more or less uncovered depending upon the amount of etching of these parts which it is desired to accomplish. Obviously, the only parts of the half-tone print which will etch are those unprotected by the ink print on top of the enamel half-tone print. By this method, the colors unprotected by the ink resists may be accentuated as much as necessary with little or no hand staging or stopping out. This is well illustrated in Figure 3 where it will be seen that the portions indicated by the reference numeral 10, having been covered, are still in their original state while the portions indicated by the reference numerals 12 and 14 have been lightened up considerably under the action of the etching solution, and the portions indicated by the reference numeral 16 have been so acted upon by the acid bath that substantially all of the half-tone dots have been eaten away to such an extent that no impression is produced on the paper over these areas. In other words, the plate is now in such a condition that no red will appear at the portions 16 in the final composite picture.

After the plate has had the desired etch, the ink acid resist is washed off with a suitable solvent such as benzene, leaving the original half-tone process enamel or other print partly etched in desired places. The entire plate is now submerged in the etching solution whereby the entire image is further etched, giving the plate the required printing depth after which it is handled in the regular manner.

Figure 4 illustrates the original plate from which the yellows in the final picture are reproduced, and in this case, the reference numeral 18 indicates a portion which, in the final picture, should have a preponderance of yellow while the reference numerals 20 indicate portions which should have little or no yellow in the final picture.

Figure 5:
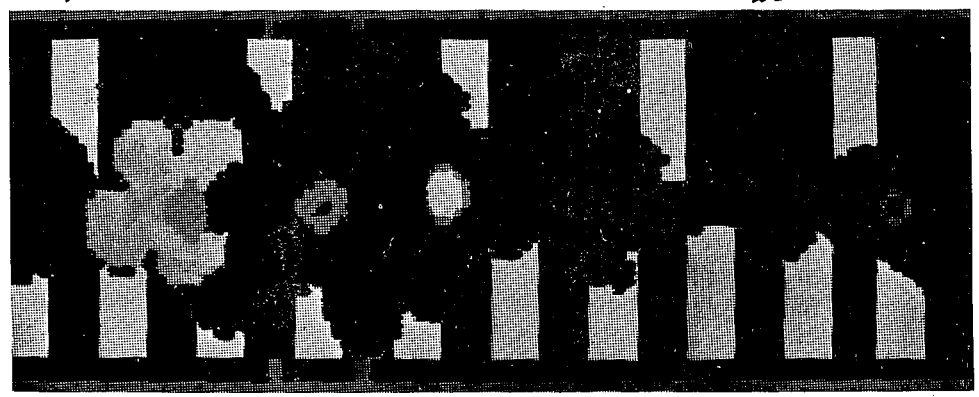
Figure 5 is a view similar to Figure 2 of a yellow plate after undergoing the first step of a treatment of this invention.
Figure 6:
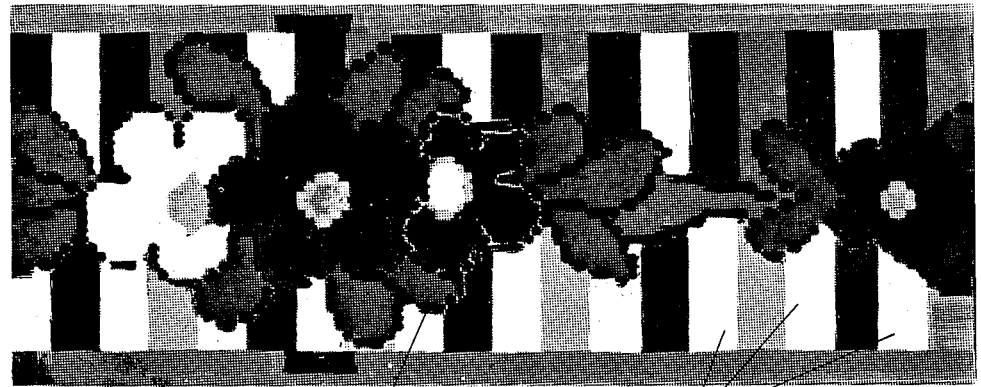
Fig. 6 shows the yellow plate after treatment and etching and in finished condition.

Figure 5 shows the plate of Figure 4 protected with an ink resist and after the first etching such as has been previously explained in connection with Figure 2, and Figure 6 shows the protected plate after the second etching, and it will be noted that the portion 18 is in its original state while the portions 20 have been so eaten away by the acid bath that none of the original half-tone dots remain.

Figure 7:
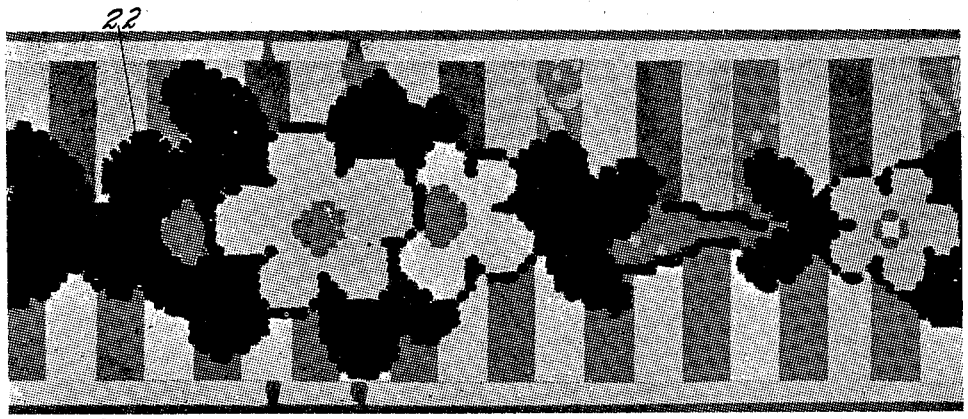
Figure 7 is an illustration of the blue plate which, in this particular instance, is shown as requiring little or no treatment, but which can be treated the same as the red or yellow plates.

Figure 7 illustrates the blue plate and here the portions indicated by the reference numerals 22 are those which it is desired to have appear blue in the final picture, and it happens that these photograph correctly while the remaining portions can be more or less etched in the regular manner as described above, as this plate ordinarily requires no special treatment.

Figure 8:
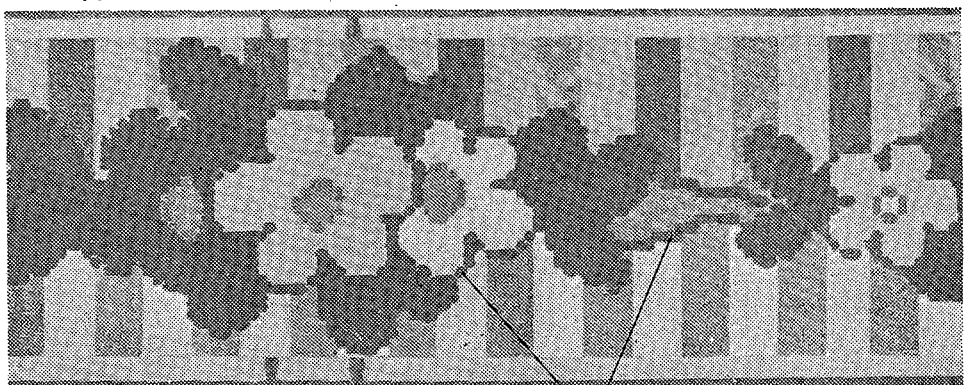
Figure 8 is a view of a black plate as it would be in its original condition without any hand staging or mechanical treatment.

Figure 8 shows an original or natural black plate, and here it will be noted that the outlines around the figures as indicated by the reference numerals 24 are, in many cases, not any heavier than the adjacent areas.

Figure 9:
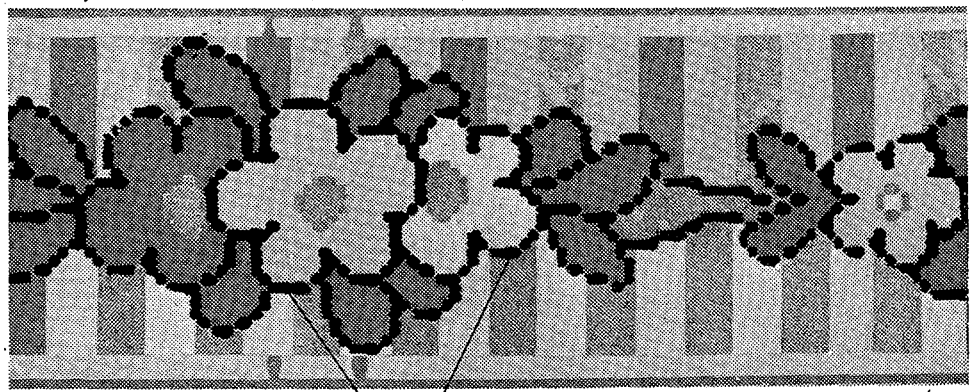
Figure 9 shows a black plate after the protective treatment of this invention and etching.

Figure 9 illustrates this black plate protected over the areas 24 by means of the imprinting thereover by the line of the image of an extra photographic plate and subsequent development as has been heretofore described.

The photographic line plates are such that when superimposed and reproduced on the half-tone prints, certain areas are protected depending upon the color or colors which it is desired to accentuate. It is this protecting of such areas by means of an extra photographic plate which comprises the gist of the invention and which eliminates inaccuracies and poor reproduction owing to the insufficiencies of the color filters and also owing to the human element in the hand-staging or stopping out process which has heretofore been considered an indispensable and necessary evil.

I am aware that many changes may be made in the use of this process, and numerous details of the adaptation thereof be varied throughout a wide range without departing from the principles of this invention, and I, therefore, do not purpose limiting the patent granted hereon otherwise than as necessitated by the prior art.

I claim as my invention:

In a photoengraving process, the steps of making a color selection negative; making a correction negative of the same subject through a dense orange filter, over-exposing to photograph the yellow, reds and magentas as much as possible, and over-developing; making a half-tone dot printing plate from the color selection negative and etching; resensitizing said printing plate with a composition capable of being insolubilized by the action of light; exposing said resensitized printing plate to light through said color correction negative; washing out the soluble portions of the resensitizing composition; and re-etching the plate.

WILLIAM M. HENSEL.